(12) United States Patent
Fehrenbach et al.

(10) Patent No.: US 6,368,060 B1
(45) Date of Patent: Apr. 9, 2002

(54) SHAPED COOLING HOLE FOR AN AIRFOIL

(75) Inventors: Jeffrey Arnold Fehrenbach; John Howard Starkweather, both of Cincinnati; Michael Beverley, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/576,287

(22) Filed: May 23, 2000

(51) Int. Cl.[7] ............................................... F04D 29/58
(52) U.S. Cl. ................................... 416/97 R; 416/97 A
(58) Field of Search .............................. 416/97 R, 97 A

(56) References Cited

U.S. PATENT DOCUMENTS

| | | | | |
|---|---|---|---|---|
| 5,720,431 A | * | 2/1998 | Sellers et al. | 416/97 R |
| 5,941,686 A | * | 8/1999 | Gupta et al. | 416/95 |
| 6,099,251 A | * | 8/2000 | LaFleur | 416/97 A |
| 6,183,199 B1 | * | 2/2001 | Beeck et al. | 416/97 R |
| 6,224,336 B1 | * | 5/2001 | Kercher | 416/97 R |

\* cited by examiner

Primary Examiner—John Kwon
(74) Attorney, Agent, or Firm—Andrew C. Hess; V. Ramaswamy

(57) ABSTRACT

A cooling hole configuration for an air-cooled component, such as a gas turbine engine airfoil. The cooling hole is configured to have cross-sectional variations and a noncircular-shaped diffuser-type opening that significantly improve the cooling film distribution across the external surface of an airfoil, with the result that heat transfer from the surrounding environment to the airfoil is reduced. The cooling hole is configured to have its central axis at an acute angle to the exterior surface of the airfoil, and defines a noncircular-shaped opening at the airfoil surface. The cooling hole generally has a first region adjacent the airfoil surface and a second region interior to the airfoil. The cooling hole is configured such that the second region has an oblong or oval-shaped cross-section, with a major diameter approximately equal to the major diameter of the first region and a minor diameter less than the major diameter of the first region, with a smooth transition existing between the first and second regions. The oblong shape of the second region is preferably the result of a recess being present in the wall of the cooling hole opposite the direction in which the cooling hole extends toward the airfoil surface, causing the central axis of the cooling hole to have an arcuate shape in which the central axis is disposed at a lesser angle to the airfoil surface in the first region than the angle in the second region. The cooling hole can be generated using a water jet technique.

20 Claims, 4 Drawing Sheets

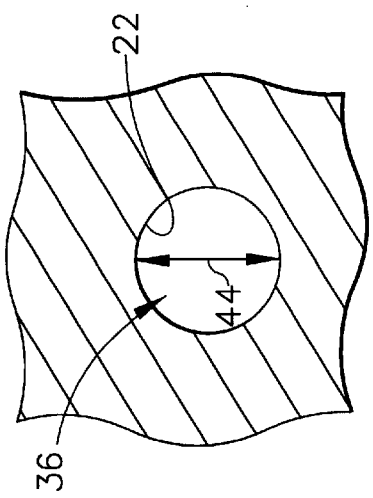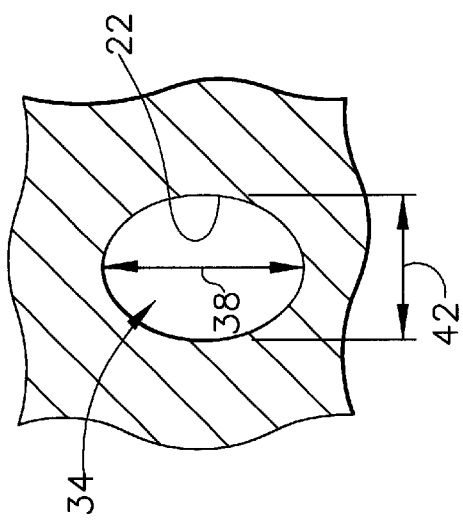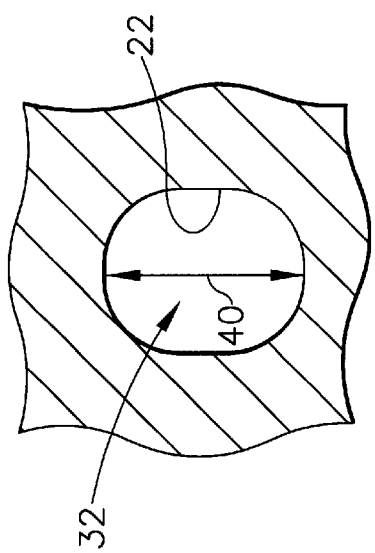

SHAPED COOLING HOLE FOR AN AIRFOIL

FIELD OF THE INVENTION

The present invention relates to components having internal passages through which cooling air flows and is then discharged through surface openings to provide an air film cooling effect. More particularly, this invention is directed to a gas turbine engine airfoil equipped with a diffuser cooling hole whose configuration increases the effectiveness of the cooling film.

BACKGROUND OF THE INVENTION

The operating environment within a gas turbine engine is both thermally and chemically hostile. Significant advances in high temperature alloys have been achieved through the formulation of iron, nickel and cobalt-base superalloys, though components formed from such alloys often cannot withstand long service exposures if located in certain sections of a gas turbine engine, such as the turbine, combustor or augmentor. A common solution is to protect the surfaces of such components with an environmental coating system, such as an aluminide coating or a thermal barrier coating (TBC) system. The latter typically includes an environmentally-resistant bond coat and a thermal barrier coating of ceramic deposited on the bond coat. Bond coats are typically formed from an oxidation-resistant alloy such as MCrAlY where M is iron, cobalt and/or nickel, or from a diffusion aluminide or platinum aluminide that forms an oxidation-resistant intermetallic. During high temperature excursions, these bond coats form an oxide layer or scale that bonds the ceramic layer to the bond coat. Zirconia ($ZrO_2$) that is partially or fully stabilized by yttria ($Y_2O_3$), magnesia (MgO) or other oxides has been widely employed as the material for the ceramic layer. The ceramic layer is typically deposited by air plasma spraying (APS), low pressure plasma spraying (LPPS), or a physical vapor deposition (PVD) technique, such as electron beam physical vapor deposition (EBPVD) which yields a strain-tolerant columnar grain structure.

While thermal barrier coating systems provide significant thermal protection to the underlying component substrate, internal cooling of components such as turbine blades (buckets) and nozzles (vanes) is generally necessary, and may be employed in combination with or in lieu of a thermal barrier coating. For this purpose, airfoils of turbine blades and nozzles of a gas turbine engine often require a complex cooling scheme in which bleed air is forced through passages within the airfoil and then discharged from the airfoil through carefully configured cooling holes. As an example, FIG. 1 shows an airfoil 110 having a cooling cavity 112 and a diffuser cooling hole 114. The cooling hole 114 has a divergent opening 116 at the exterior surface 117 of the airfoil 110 to promote the distribution of a cooling film over the downstream airfoil contour and therefore increase the effectiveness of the cooling film. The performance of a turbine airfoil is directly related to the ability to provide uniform cooling of its surfaces with a limited amount of cooling air. In particular, the size and shape of each opening determine the amount of air flow exiting the opening and the distribution of the air flow across the downstream surface of the airfoil, and also affect the overall flow distribution within the cooling circuit containing the opening. Other factors, such as backflow margin, are also affected by variations in opening size. Consequently, cooling holes, their openings and the processes by which they are formed and configured are critical.

For airfoils without a thermal barrier coating, cooling holes are typically formed by such conventional drilling techniques as electrical-discharge machining (EDM) and laser machining. An example of a diffuser cooling hole 122 formed by EDM and laser machining methods is depicted in FIG. 2. The noncircular diffuser opening 124 is generated by removing extra material at the airfoil surface along one side of the opening 122, such that the central axis 118 of the hole 122 diverges from a linear centerline 120 only in the immediate vicinity of the opening 124, but otherwise coincides with the centerline 120 throughout the remaining length of the hole 122. Notably, the lower wall of the hole (i.e., the wall farthest from the surface and on the side of the hole 122 enlarged by the opening 124) is arcuate near the surface as a result of the manner in which the opening 124 was enlarged and shaped, while the upper wall of the hole 122 (i.e., the wall nearest the surface and diametrically-opposite the side of the hole 122 enlarged by the opening 124) is substantially unaffected by the opening 124, and is therefore essentially straight. Other than in the immediate vicinity of the opening 124, the hole 122 has a roughly circular cross-section.

While EDM and laser machining techniques can be employed to produce the noncircular shape required for a diffuser opening 124, these methods are limited in their ability to tailor the shape of the cooling hole much below the airfoil surface. Another shortcoming of EDM is that cooling holes cannot be formed by this method in an airfoil having a ceramic TBC since the ceramic is electrically nonconducting. Laser machining techniques are also unacceptable for forming cooling holes in an airfoil protected by a TBC, because laser machining has a tendency to spall the brittle ceramic TBC by cracking the interface between the airfoil substrate and the ceramic. Accordingly, cooling holes have typically been formed by EDM and laser machining prior to applying the TBC system, limiting the thickness of the TBC which can be applied or necessitating a final operation to remove ceramic from the cooling holes in order to reestablish the desired size and shape of the openings.

From the above, it can be seen that the geometric configuration of a cooling hole for an air-cooled airfoil is limited by the techniques available to produce the cooling holes, particularly if the airfoil is protected by a TBC. While cooling holes formed by EDM and laser machining provide a satisfactory cooling effect, it would be desirable if the size and shape of a cooling hole could be tailored to enhance the cooling film distribution on the external surfaces of the airfoil, and thereby increase the effectiveness of the cooling film.

SUMMARY OF THE INVENTION

The present invention is embodied in a cooling hole configuration for an air-cooled component, such as a gas turbine engine airfoil. The cooling hole is configured to have cross-sectional variations and a noncircular-shaped diffuser-type opening, as well as a central axis at an acute angle to the exterior surface of the component. The cooling hole generally has a first region immediately adjacent the exterior surface, a second region beneath the first region and interior to the component, and a third region immediately adjacent to a cooling cavity within the component. A recess is present in the wall of the second region nearest the exterior surface. As a result, the recessed wall is curved instead of straight, causing the central axis of the cooling hole to have an arcuate shape in which the central axis is disposed at a lesser angle to the surface in the first region than in the second region. The recess also causes the second region of the cooling hole to have an oblong or oval cross-sectional shape as compared to the first and third regions. The first region has a larger cross-sectional area than the second region, while the third region has a circular cross-section with a smaller-cross-sectional area than the second region. Smooth transitions preferably exist between the first, second and third regions.

BRIEF DESCRIPTION OF THE DRAWINGS

FIGS. 5, 6 and 7 show the cross-sectional shapes of the diffuser hole of FIG. 3 at different locations along the length of the hole in accordance with the preferred embodiment of this invention.

DETAILED DESCRIPTION OF THE INVENTION

Figure 1:
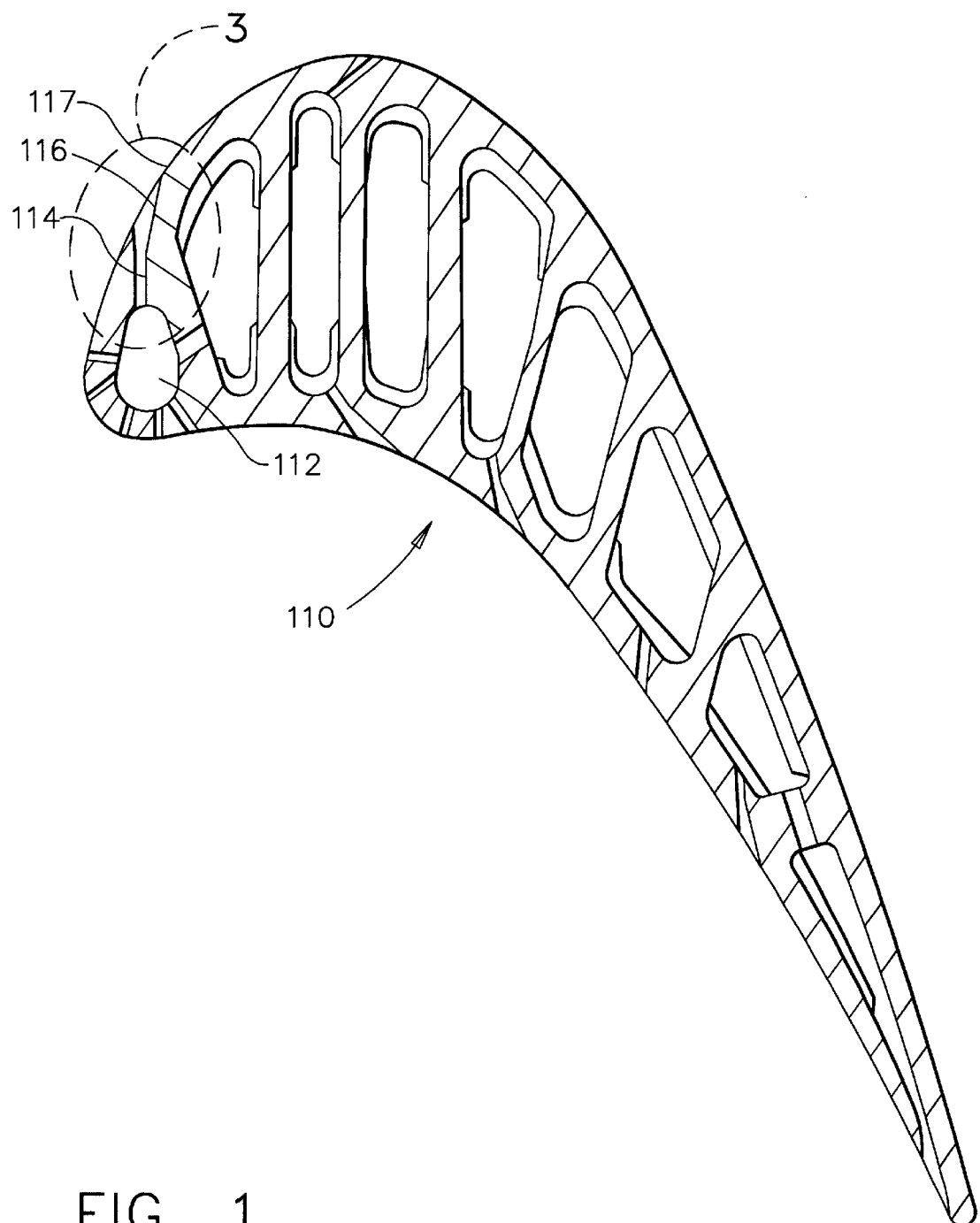
FIG. 1 is a cross-sectional view of an airfoil having a diffuser hole through a wall section of the airfoil.

Referring to FIG. 1, the invention will be described in reference to an airfoil 10. However, the invention is generally applicable to a variety of air-cooled components that operate within a thermally hostile environment, and particularly those that are a body of material protected by a thermal barrier coating system. Notable examples of such components include the high and low pressure turbine nozzles and blades, combustor liners and augmentors of gas turbine engines.

Figure 3:
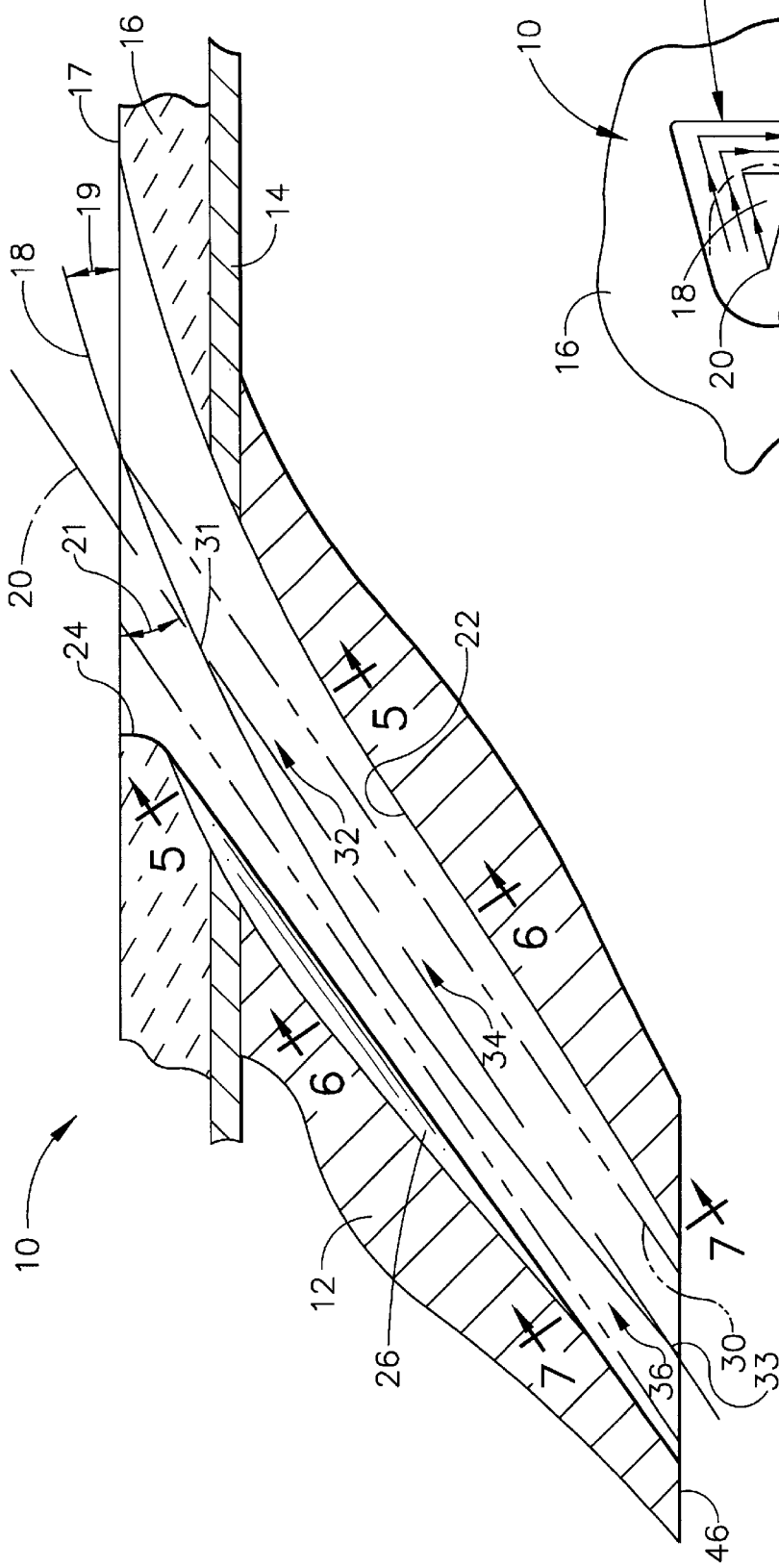
FIGS. 3 and 4 are sectional and plan views, respectively, of a diffuser hole in accordance with a preferred embodiment of this invention.

As represented in FIG. 3, the airfoil 10 has a wall 12 protected by a thermal barrier coating system composed of a ceramic layer 16 adhered to the wall 12 with a bond coat 14. As is the situation with high temperature components of a gas turbine engine, the wall 12 is preferably formed of an iron, nickel or cobalt-base superalloy. The bond coat 14 is preferably an oxidation-resistant composition, such as a diffusion aluminide or MCrAlY, that forms an alumina ($Al_2O_3$) layer or scale (not shown) on its surface during exposure to elevated temperatures. The alumina scale protects the underlying wall 12 from oxidation and provides a surface to which the ceramic layer 16 more tenaciously adheres.

As known in the art, the ceramic layer 16 can be deposited by air plasma spraying (APS), low pressure plasma spraying (LPPS), or physical vapor deposition (PVD) techniques such as electron beam physical vapor deposition (EBPVD), the latter of which yields a strain-tolerant columnar grain structure. A preferred material for the ceramic layer 16 is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria ($CeO_2$) or scandia ($SC_2O_3$).

The invention entails a cooling hole 22 formed through the ceramic layer 16, bond coat 14 and wall 12, with an opening 24 at the exterior surface of the airfoil 10 (i.e., the surface 17 of the ceramic layer 16). As known in the art, heat is transferred from the airfoil 10 by forcing bleed air through passages beneath the airfoil wall 12. The amount of heat transferred from the hostile environment adjacent surface 17 to the airfoil exterior surface is reduced by discharging the cooling air from the airfoil 10 through cooling holes, such as the one shown in FIGS. 3 and 4. The cooling hole 22 and opening 24 are configured to provide for a uniform distribution of cooling air across the exterior airfoil surface.

As can be seen in FIG. 3, the cooling hole 22 has an arcuate central axis 18 that deviates from what will be termed the linear axis 20 of the hole 22. The linear axis 20 is the original central axis of the cooling hole 22 when formed as described below, and serves as a reference when describing the final shape of the cooling hole 22 and opening 24 depicted in FIGS. 3 and 4. The linear axis 20 is preferably disposed at an angle 21 of about 20 to about 40 degrees from the airfoil surface, though it is foreseeable that the axis 20 could be oriented at lesser or greater angles to the airfoil surface.

Figure 4:
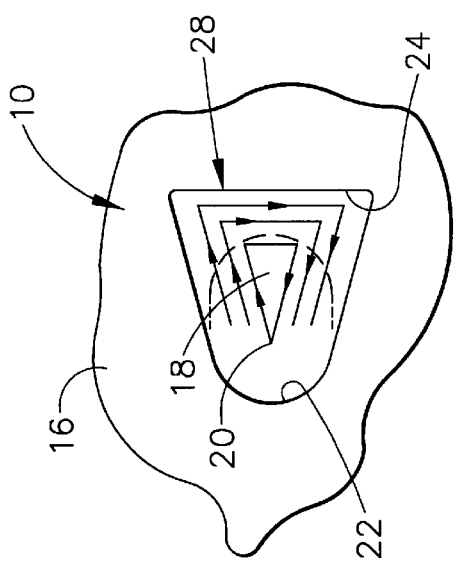

As shown in FIG. 4, the opening 24 is preferably configured as a diffuser of the type used with turbine nozzles to uniformly distribute cooling air as a film across the nozzle surface. For this purpose, the shape of the opening 24 at the airfoil surface diverges from the linear axis 20 of the cooling hole 22, causing the opening 24 to have a generally trapezoidal or triangular shape with the narrower end rounded that encourages cooling film development across the surface of the ceramic layer 16 as the cooling air exits the cooling hole 22. Due to the shape of the opening 24, the central axis 18 of the cooling hole 22 at the opening 24 and the adjacent portion of the cooling hole 22 is offset from the linear axis 20 of the cooling hole 22 in the direction of air discharge from the opening 24, and forms a smaller angle 19 with surface 17 than angle 21, as is evident from FIG. 3.

Also seen from FIG. 3, the upper wall surface 26 of the cooling hole 22 (i.e., the wall surface nearest the exterior airfoil surface and diametrically opposite the diverging portion 29 of the opening 24) is recessed, such that the cooling hole 22 locally has an oblong or generally oval shape. As a result, the central axis 18 of the cooling hole 22 in the vicinity of the recessed wall surface 26 causes the center of the passage to be offset from the linear axis 20 in a direction toward the wall surface 26, and therefore diametrically opposite from the offset at the airfoil surface. Between the airfoil surface and the recessed wall surface 26, the central and linear axes 18 and 20 intersect as depicted at 31 in FIG. 3. The central and linear axes 18 and 20 also intersect at 33 near interior surface 46 beneath, or further interior to the recessed wall surface 26, as a result of the cooling hole 22 and its central axis 18 generally having a continuously arcuate shape through the entire thickness of the airfoil section formed by the wall 12, bond coat 14 and ceramic layer 16. Where the central and linear axes 18 and 20 intersect, at 31, e.g., between the airfoil surface and the recessed wall surface 26, the cross-section of the cooling hole 22 is substantially circular. As noted above, the cross-section of the cooling hole 22 is more oblong, generally oval-shaped, at the recessed wall surface 26. Notably, because the cooling hole 22 and its central axis 18 are arcuate, the exit angle of air discharged from the opening 24 (i.e., the angle of the central axis 18 at the opening 24 relative to the airfoil surface) is less than the angle of the remainder of the central axis 18 relative to the airfoil surface 17.

Figure 2:
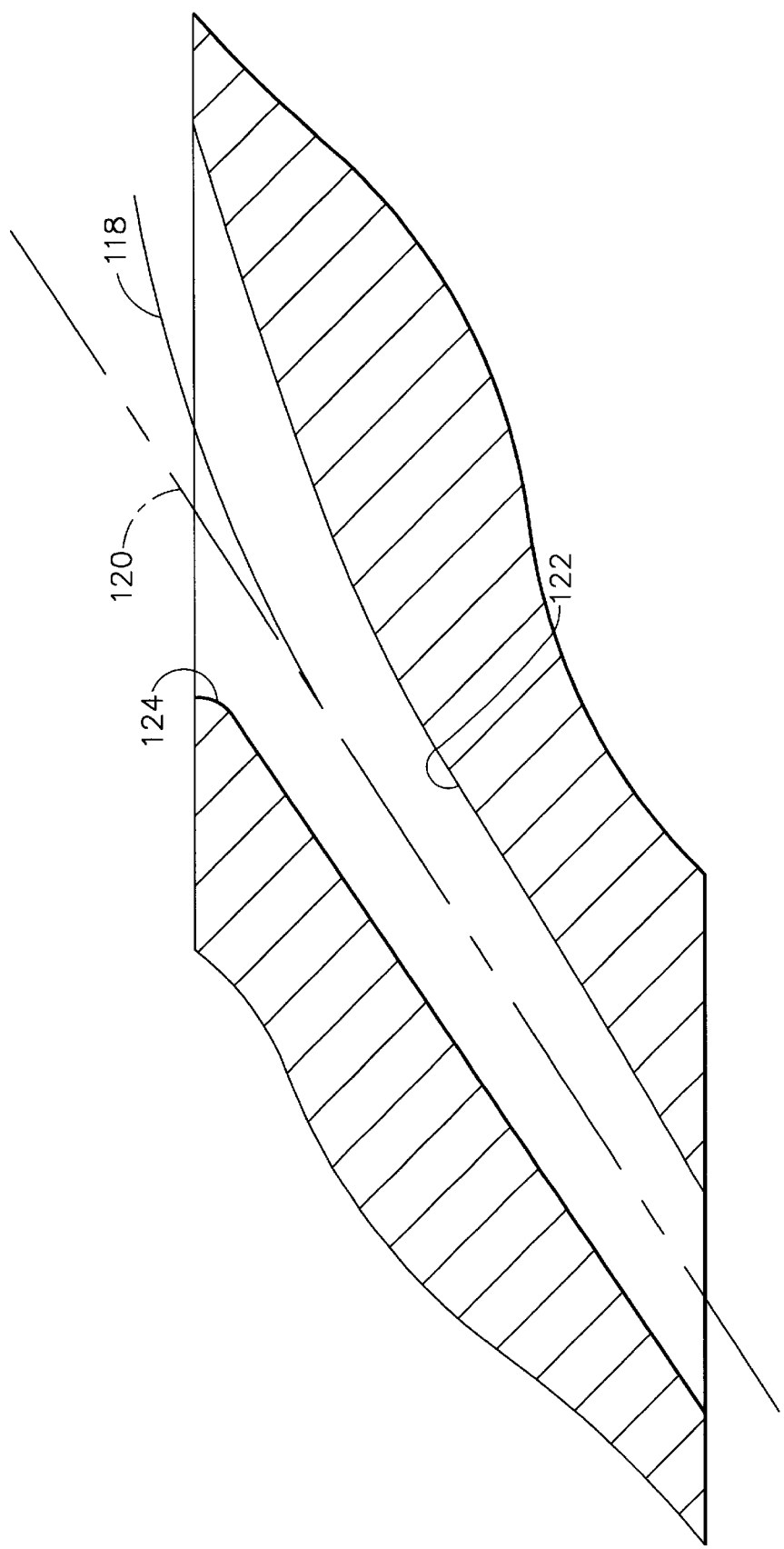
FIG. 2 is a detailed sectional view of a prior art diffuser hole.

The arcuate shape of the cooling hole 22 depicted in FIGS. 3 and 4 complements the shape of the opening 24 to provide for a greatly improved cooling film distribution and enhanced cooling effect at the airfoil surface. While not wishing to be held to any particular theory, it is believed that the recessed wall surface 26 reduces the exit angle at the opening 24 and provides increased diffusion as the cooling air flows from the region of the hole 22 below the recessed wall 26 into the region of the hole 22 at the recessed wall 26. The aspects each reduce the component of velocity which would tend to lift the air discharged from the opening 24 off the surface of the airfoil 10. The differences between the cooling hole 22 of this invention and cooling holes of the prior art can be seen from a comparison of FIGS. 2 and 3, the former of which shows a prior art EDM or laser machined cooling hole 122 whose central axis 118 diverges from its linear centerline 120 only in the immediate vicinity of the cooling hole opening 124, and otherwise coincides with the centerline 120 along the length of the hole 122.

From FIG. 3, it can be seen that there are two primary transitions within the cooling hole 22—a first transition region between the oblong-shaped cross-sectional region 34 of the cooling hole 22 at the recessed wall surface 26 and the circular-shaped region 32 of the cooling hole 22 above the recessed wall surface 26 relative to surface 17, and a second transition region between the region 34 and region 36. The magnitude of these transitions can be seen in comparing the cross-sectional shapes of the hole 22 outside the transitions. FIG. 5 shows the generally rectangular cross-section region 32 of the hole 22 adjacent to the opening 24, FIG. 6 shows the generally oblong-shaped cross-section region 34 at the recessed wall surface 26 interior to the region 32 relative to surface 17, and FIG. 7 shows the generally circular cross-section region 36 of the hole 22 nearest the interior surface 46 of the wall 12. Notably, the major diameter 38 of the oblong-shaped cross-section region 34 is approximately equal to the major diameter 40 of the region 32 adjacent the opening 24, while the transverse minor diameter 42 of the oblong-shaped cross-section region 34 is approximately equal to the diameter 44 of the circular cross-section region 36 adjacent the interior surface 46 of the wall 12. The region 34 is at a position approximately at the midpoint of the length of the hole 22 between surfaces 17 and 46, but may be located at any suitable position to achieve the improved cooling performance. It is believed that these different-shaped regions and the transitions therebetween yield the desirable performance characteristics of the cooling hole 12 of this invention.

Those skilled in the art will appreciate that any surface irregularities and discontinuities resulting from these transitions within the cooling hole 22 will impede air flow through the cooling hole 22, thereby reducing the amount of air flow exiting the opening 24 and negatively affecting the air flow distribution across the surface of the airfoil 10 and the overall flow distribution within the cooling circuit containing the cooling hole 22 and opening 24. According to the invention, smooth transitions (i.e., surfaces free of irregularities and discontinuities) can be achieved within the cooling hole 22 and opening 24 using a high-pressure fluid stream.

A first step in generating the cooling hole 22 and opening 24 shown in FIGS. 3 and 4 is to form a straight pilot or preliminary hole 30 (shown in phantom) through the ceramic layer 16, bond coat 14 and wall 12. The hole 30 preferably has a circular cross section with a diameter smaller than that of the cooling hole 22. For example, for a cooling hole 22 having a diameter of about 0.035 inch (about 0.9 mm), the preliminary hole 30 may be formed to have a diameter of about 0.020 inch (about 0.5 mm), or roughly half that intended for the cooling hole 22. Suitable techniques for forming the hole 30 include drilling with an abrasive water jet, though it is foreseeable that the hole 30 could be formed by such other methods as casting, laser or EDM for non-TBC applications. As a result of the drilling operation, the hole 30 has a substantially uniform circular cross section whose axis establishes the linear axis 20 of the cooling hole 22.

Once the preliminary hole 30 is formed, a high pressure fluid stream is targeted at the hole 30 to generate the final size and shapes for the cooling hole 22 and opening 24. While various fluids could be used, water is preferred as being environmentally safe and because it will not chemically affect the bond coat 14 or the underlying superalloy wall 12. The water preferably contains an abrasive grit, which greatly enhances the cutting action. A suitable process employs water pressurized to at least about 200 bar, and preferably about 550 bar, and discharged from a nozzle having one or more orifices, each orifice having a diameter of about 0.05 to about 0.4 millimeter and being spaced about 1.25 to about 9.5 centimeters from the surface of the ceramic layer 16. A suitable abrasive flow rate is about 0.05 to 1.0 pounds per hour (about 0.023 to 0.45 pounds per hour) using garnet or alumina particles of about 250 to 50 mesh.

An abrasive water jet so formed has been found to provide sufficient energy to generate the desired shape for the opening 24 at the airfoil surface, generate the hollowed recess 26 in the wall surface of the cooling hole 22 to produce the oblong-shaped region 34 within the cooling hole 22, and generally enlarge the diameter of the preliminary hole 30 to that desired for the cooling hole 22, without damaging or spalling the bond coat 14 or ceramic layer 16 surrounding the opening 24. To appropriately shape the opening 24 and create the recessed wall surface 26 of the cooling hole 22, the water jet angle of attack is preferably maintained within about five degrees of the linear axis 20 of the preliminary hole 30. However, it is foreseeable that lesser and greater angles could be employed.

As shown in FIG. 4, the water jet is preferably discharged toward the ceramic layer 16 while being traversed through a series of nested or concentric patterns 28 that are not concentric with the linear axis 20 of the preliminary hole 30. FIG. 4 portrays a preferred technique for this invention, in which the water jet traverses through a nested series of trapezoidal patterns 28, the innermost of which preferably has a short side that coincides with the linear axis 20 of the preliminary hole 30. Preferably, the water jet operation is initiated at the linear axis 20, and traverses the surface of the ceramic layer 16 along the paths indicated by the arrows while maintaining the water jet angle of attack. As the water jet strikes the airfoil surface, the jet is deflected and then impacts the wall surface in the region of hollowed recess 26 before continuing through the hole 30. With the completion of each trapezoidal-shaped pattern 28, the water jet is repositioned to the next pattern 28 surrounding the pattern 28 just completed. The series of patterns 28 may consist of any number of individual patterns 28, with a suitable number being readily ascertainable by experimentation.

According to this invention, the cooling hole 22 is characterized by smooth transitions between the circular-shaped region 36 of the cooling hole 22 farthest from the airfoil exterior surface, the oblong-shaped region 34 at the recessed wall surface 26, and the generally rectangular-shaped cross section region 32 at opening 24 at the airfoil surface. Smooth transitions have been achieved with an abrasive water jet where the major diameter 38 of the hole 22 at the recessed wall surface 26 is significantly greater, e.g., about 25% greater, than the transverse minor diameter 42 of the hole 22 at the same location, as depicted in FIG. 6. An important aspect of the invention is that the geometry of the cooling hole 22 shown in FIGS. 3 through 7 has been unexpectedly determined to achieve cooling efficiencies of about 50% higher than that possible with prior art EDM and laser machined cooling holes of the type shown in FIG. 2. Consequently, this invention significantly promotes the service life of the airfoil 10 as a result of a more uniform cooling film at the airfoil external surfaces.

While the invention has been described in terms of a preferred embodiment, it is apparent that other forms could be adopted by one skilled in the art. For example, it is possible that other methods could be adopted to form the preferred cooling hole 22 and opening 24 depicted in the FIGS. 3 and 4. Therefore, the scope of the invention is to be limited only by the following claims.

What is claimed is:

1. An air-cooled component comprising a body of material having at least one cooling hole with a central axis at an acute angle to an exterior surface of the component the cooling hole including an opening at the exterior surface of the component, a first region adjacent the exterior surface of the component and a second region interior to the first region relative to the exterior surface, the cooling hole having diametrically-opposed first and second wall portions, the first wall portion being closer to the exterior surface of the component and the second wall portion being farther from the exterior surface of the component, the cooling hole having a recessed wall surface in the first wall portion within the second region of the cooling hole.

2. A component as recited in claim 1, wherein the opening has a noncircular shape.

3. A component as recited in claim 1, wherein the first region of the cooling hole has an approximately circular cross-sectional shape, and the second region has an oblong cross-sectional shape.

4. A component as recited in claim 1, wherein the cooling hole has a third region interior to the second region relative to the exterior surface of the component, the third region having a circular cross-section and a cross-sectional area less than the cross-sectional area of the second region.

5. A component as recited in claim 4, wherein the second region has a major diameter that is approximately equal to a diameter of the first region, and the second region has a transverse minor diameter that is approximately equal to a diameter of the third region.

6. A component as recited in claim 1, wherein the recess is substantially free of a ceramic coating.

7. A component as recited in claim 1, wherein the central axis of the cooling hole is arcuate, the central axis being at a lesser angle to the exterior surface of the component in the first region than in the second region.

8. A component as recited in claim 1, wherein the first region has a cross-sectional area that is larger than a cross-sectional area of the second region.

9. A component as recited in claim 1, further comprising a thermal barrier coating on the exterior surface of the component, the thermal barrier coating defining the exterior surface of the component and containing the opening of the cooling hole.

10. A component as recited in claim 1, wherein the component is an airfoil of a gas turbine engine.

11. An air-cooled component of a gas turbine engine, the component having an airfoil comprising:
   a wall;
   a thermal-insulating ceramic layer adhered to the wall of the airfoil and defining an exterior surface of the airfoil; and
   a cooling hole extending through the wall and the ceramic layer at an acute angle to the exterior surface of the airfoil, the cooling hole having a continuous linear axis and a continuously arcuate central axis, the cooling hole defining a diffuser opening at the exterior surface of the airfoil, the cooling hole having a first generally circular cross-sectional region adjacent the exterior surface of the airfoil and a second generally oval cross-sectional region interior to the first cross-sectional region relative to the exterior surface, the second cross-sectional region having a major diameter approximately equal to a diameter of the first cross-sectional region, the second cross-sectional region having a minor diameter transverse to the major diameter of the second cross-sectional region, the minor diameter of the second cross-sectional region being less than the diameter of the first cross-sectional region, the cooling hole having a smooth transition between the first and second cross-sectional regions, the arcuate central axis intersecting the linear axis in the first cross-sectional region and being disposed at a lesser angle relative to the exterior surface of the airfoil than the linear axis within the first and second cross-sectional regions of the cooling hole.

12. An air-cooled component as recited in claim 11, wherein the major diameter of the second cross-sectional area is about 25% greater than the minor diameter of the second cross-sectional area.

13. An air-cooled component as recited in claim 11, wherein the opening has a generally trapezoidal shape.

14. An air-cooled component as recited in claim 11, wherein the cooling hole has diametrically-opposed upper and lower wall surface regions, the upper wall surface region being closest to the exterior surface of the airfoil and the lower wall surface region being farthest from the exterior surface of the airfoil, the cooling hole having a recess in a portion of the upper wall surface region at the second cross-sectional region of the cooling hole.

15. An air-cooled component as recited in claim 11, wherein the central axis is at a lesser angle to the exterior surface of the airfoil in the first cross-sectional region than in the second cross-sectional region.

16. An air-cooled component as recited in claim 11, wherein the cooling hole has a length through the ceramic layer and wall of the airfoil, the second cross-sectional region of the cooling hole being approximately at a midpoint of the length of the cooling hole.

17. An air-cooled component as recited in claim 11, wherein the cooling hole has a third cross-sectional region interior to the second cross-sectional region relative to the exterior surface of the airfoil, the third cross-sectional region having a circular cross-section and a cross-sectional area less than the cross-sectional area of the second cross-sectional region.

18. An air-cooled component as recited in claim 11, wherein the minor diameter of the second region is approximately equal to a diameter of the third region.

19. An air-cooled component of a gas turbine engine, the component having an airfoil comprising:
   a wall having a thickness;
   a bond coat on the wall;
   a thermal-insulating ceramic layer adhered to the wall with the bond coat, the ceramic layer having a surface that defines an exterior surface of the airfoil; and
   a cooling hole extending through the wall and ceramic layer, the cooling hole having an arcuate central axis and defining a diffuser opening at the surface of the ceramic layer, the cooling hole having a first cross-sectional region adjacent the surface of the ceramic layer, a second cross-sectional region beneath the first cross-sectional region and approximately at a midpoint of the thickness of the cooling hole, and a third cross-sectional region beneath the second cross-sectional region relative to the surface of the ceramic layer, the second cross-sectional region having a cross-sectional area that is smaller than a cross-sectional area of the first cross-sectional region and larger than a cross-sectional area of the third cross-sectional region, the central axis being at a lesser angle to the surface of the ceramic layer in the first cross-sectional region than in the second cross-sectional region, the cooling hole having a first wall portion that is closer to the exterior surface of the airfoil than a diametrically-opposed second wall portion of the cooling hole, the cooling hole having a recessed wall surface in the first wall portion within the second cross-sectional region of the cooling hole, the cooling hole having smooth transitions between the first and second cross-sectional regions and between the second and third cross-sectional regions, the cooling hole being substantially free of the ceramic layer.

20. An air-cooled component as recited in claim 11, wherein the cooling hole is substantially free of the ceramic material.

* * * * *